US011984688B2

(12) United States Patent
Chen

(10) Patent No.: US 11,984,688 B2
(45) Date of Patent: May 14, 2024

(54) ELECTRICAL CONNECTOR HAVING A SHIELDING SHELL WITH A PERIPHERAL WALL SURROUNDING A PAIR OF HOUSING SIDE WALLS TO FORM AN ANNULAR GROOVE

(71) Applicants: FOXCONN (KUNSHAN) COMPUTER CONNECTOR CO., LTD., Kunshan (CN); FOXCONN INTERCONNECT TECHNOLOGY LIMITED, Grand Cayman (KY)

(72) Inventor: Ming-Ching Chen, New Taipei (TW)

(73) Assignees: FOXCONN (KUNSHAN) COMPUTER CONNECTOR CO., LTD., Kunshan (CN); FOXCONN INTERCONNECT TECHNOLOGY LIMITED, Grand Cayman (KY)

( * ) Notice: Subject to any disclaimer, the term of this patent is extended or adjusted under 35 U.S.C. 154(b) by 82 days.

(21) Appl. No.: 17/688,834

(22) Filed: Mar. 7, 2022

(65) Prior Publication Data

US 2022/0285888 A1 Sep. 8, 2022

(30) Foreign Application Priority Data

Mar. 8, 2021 (CN) ........................ 202120488846.X

(51) Int. Cl.

| | |
|---|---|
| ***H01R 13/6582*** | (2011.01) |
| ***H01R 12/71*** | (2011.01) |
| ***H01R 13/516*** | (2006.01) |
| ***H01R 13/629*** | (2006.01) |
| ***H01R 13/6585*** | (2011.01) |
| *H01R 13/648* | (2006.01) |

(Continued)

(52) U.S. Cl.

CPC ....... *H01R 13/6582* (2013.01); *H01R 12/716* (2013.01); *H01R 13/516* (2013.01); *H01R 13/629* (2013.01); *H01R 13/6585* (2013.01); *H01R 12/71* (2013.01); *H01R 12/712* (2013.01); *H01R 13/648* (2013.01); *H01R 13/658* (2013.01); *H01R 13/6581* (2013.01)

(58) Field of Classification Search

CPC ............. H01R 13/6582; H01R 12/716; H01R 13/516; H01R 13/629; H01R 13/6585; H01R 12/71; H01R 12/712; H01R 13/648; H01R 13/658; H01R 13/6581

See application file for complete search history.

(56) References Cited

U.S. PATENT DOCUMENTS 10,446,985 B2 10/2019 Ooi
11,075,475 B2 7/2021 Chen (Continued)

FOREIGN PATENT DOCUMENTS

CN 112117571 A 12/2020

*Primary Examiner* — Abdullah A Riyami
*Assistant Examiner* — Justin M Kratt
(74) *Attorney, Agent, or Firm* — Ming Chieh Chang

(57) ABSTRACT

An electrical connector includes: an elongated insulative housing having a bottom wall, a pair of side walls along a lengthwise direction, and an island located between the pair of side walls to form two longitudinal grooves; a row of contacts secured to each of the pair of side walls and exposed to a corresponding groove; and a shielding shell having a base secured to the insulative housing and a peripheral wall surrounding the pair of side walls to form an annular groove.

15 Claims, 13 Drawing Sheets

(51) Int. Cl.
*H01R 13/658* (2011.01)
*H01R 13/6581* (2011.01)

(56) References Cited

U.S. PATENT DOCUMENTS

| | | | | |
|---|---|---|---|---|
| 11,539,170 | B2 * | 12/2022 | Oosaka | H01R 12/712 |
| 11,664,628 | B2 * | 5/2023 | Shimomura | H01R 12/716 439/607.05 |
| 2020/0212634 | A1 * | 7/2020 | Teruki | H01R 13/6471 |
| 2021/0175665 | A1 | 6/2021 | Someya et al. | |

* cited by examiner

ELECTRICAL CONNECTOR HAVING A SHIELDING SHELL WITH A PERIPHERAL WALL SURROUNDING A PAIR OF HOUSING SIDE WALLS TO FORM AN ANNULAR GROOVE

BACKGROUND OF THE INVENTION

1. Field of the Invention

The present invention relates to an electrical connector comprising: an elongated insulative housing having a bottom wall, a pair of side walls along a lengthwise direction, and an island located between the pair of side walls to form two longitudinal grooves; a plurality of contacts secured to each of the pair of side walls and exposed to a corresponding groove; and an outer shielding shell.

2. Description of Related Art

China Patent No. 112117571 discloses an electrical connector assembly comprising a plug connector and a receptacle connector wherein two rows of male contacts of the plug connector are inserted into two rows of female contacts of the receptacle connector, respectively. In particular, the plug connector includes an elongated insulative housing having a bottom wall, a pair of side walls, and a pair of end walls, the pair of side walls and the pair of end walls together enclosing a mating groove, each of the pair of side walls having a pair of expanded portions at two opposite ends thereof to define a receiving space; a plurality of contacts secured to each of the pair of side walls and exposed to both a corresponding mating groove and an associated receiving space; and an outer shielding shell.

SUMMARY OF THE INVENTION

An electrical connector comprises: an elongated insulative housing having a bottom wall, a pair of side walls along a lengthwise direction, and an island located between the pair of side walls to form two longitudinal grooves; a plurality of contacts secured to each of the pair of side walls and exposed to a corresponding groove; and a shielding shell having a base secured to the insulative housing and a peripheral wall surrounding the pair of side walls to form an annular groove.

DETAILED DESCRIPTION OF THE PREFERRED EMBODIMENT

Figure 1:
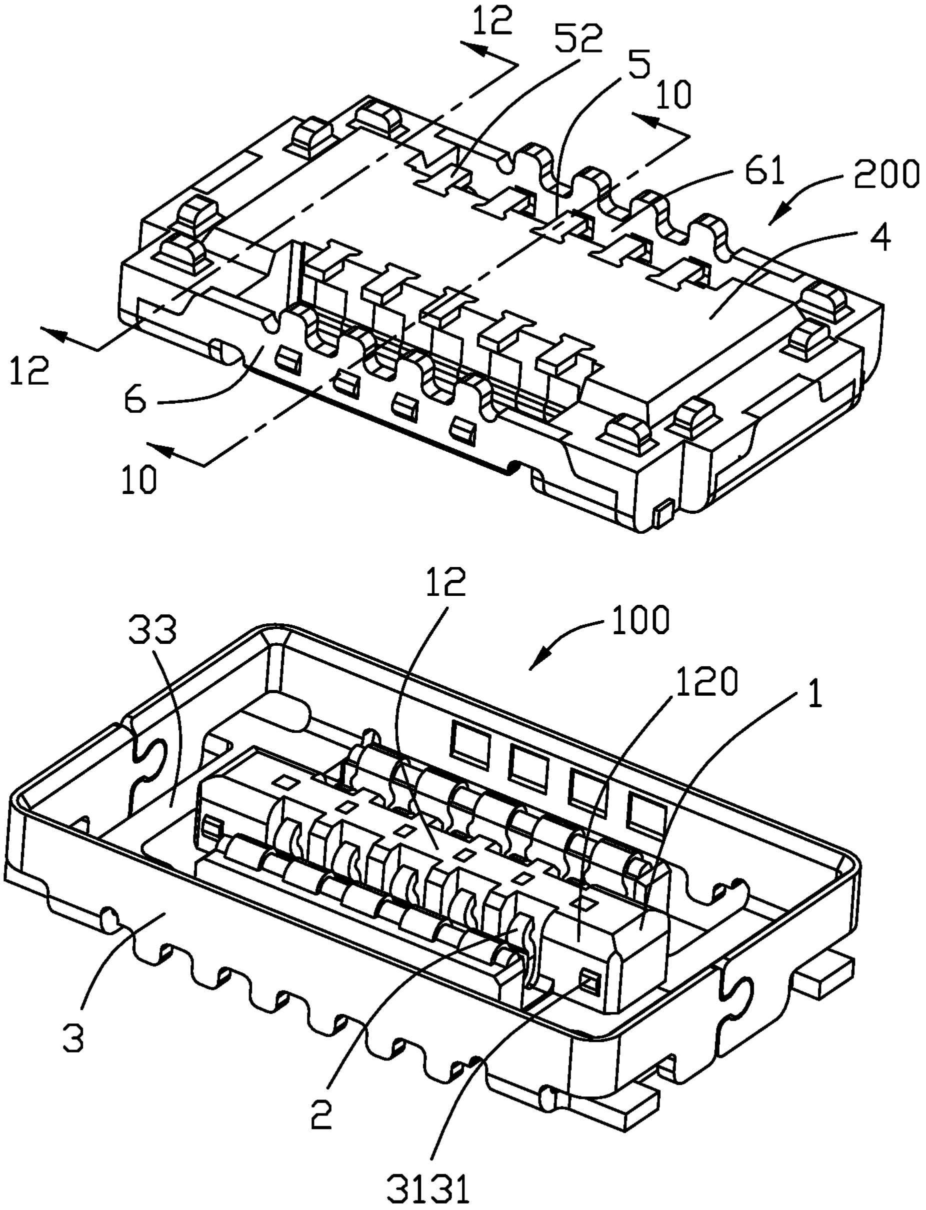
FIG. 1 is a perspective view of an electrical connector assembly in accordance with the present invention.
Figure 2:
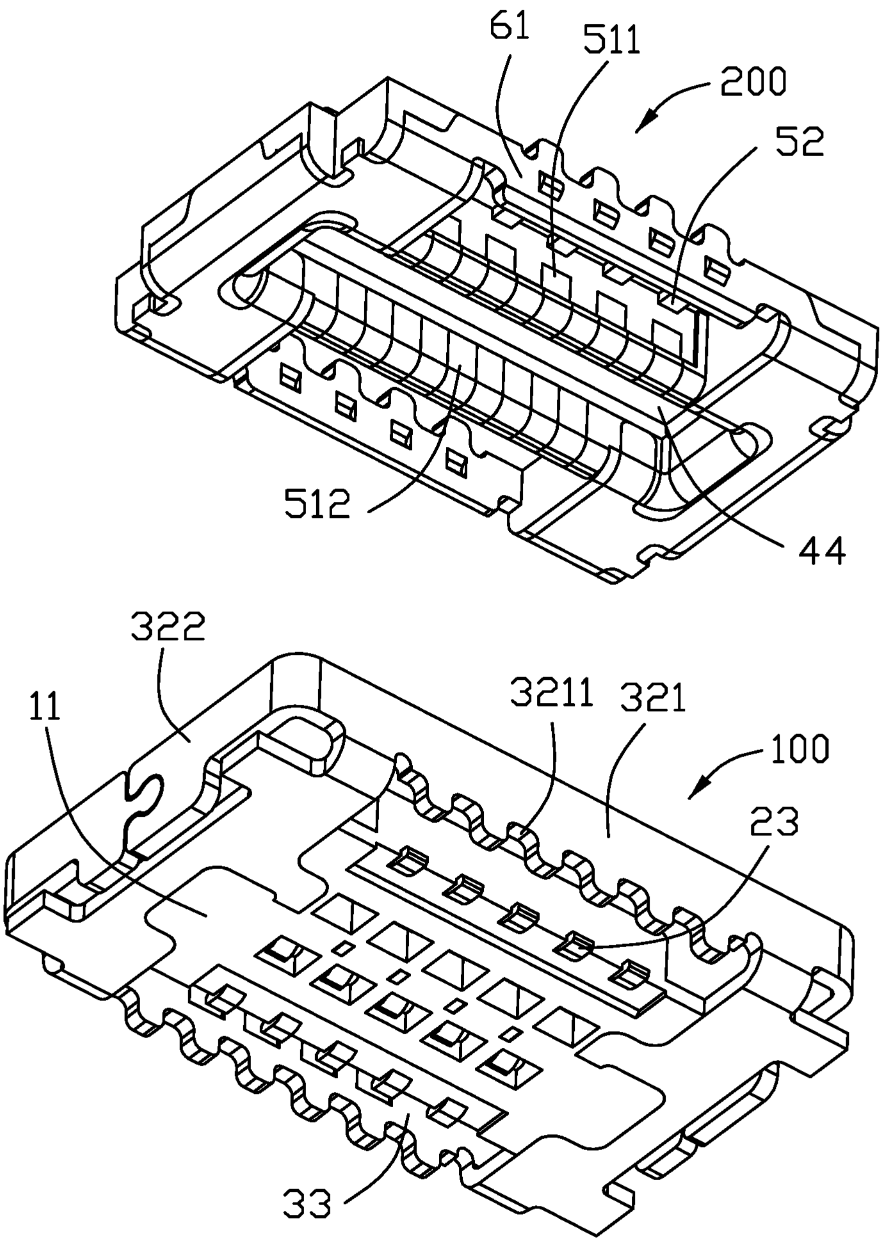
FIG. 2 is another perspective view of the electrical connector assembly.
Figure 3:
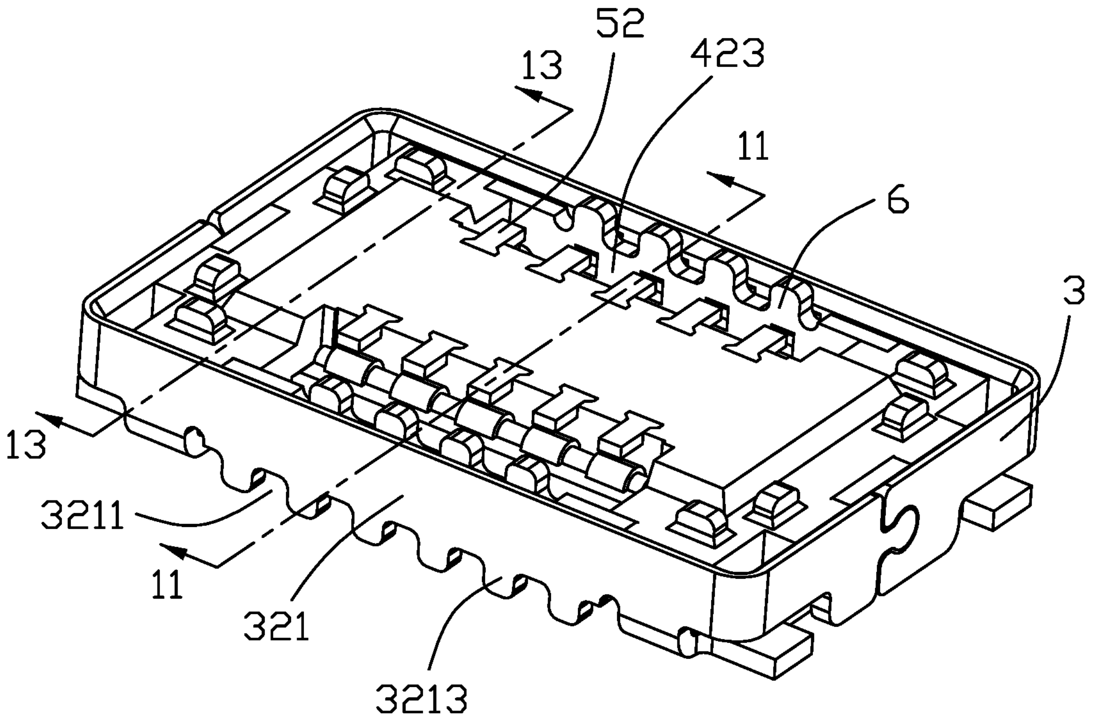
FIG. 3 is a further perspective view of the electrical connector assembly in a mated state.
Figure 4:
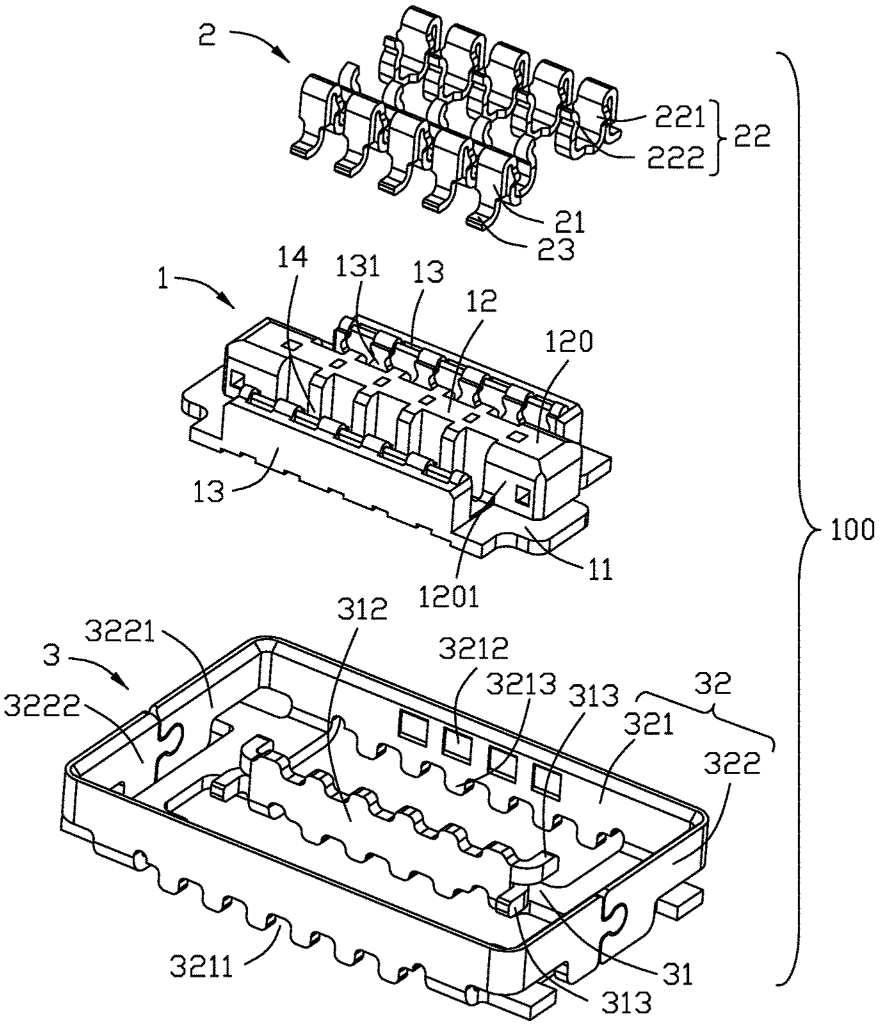
FIG. 4 is an exploded view of a receptacle connector of the electrical connector assembly.
Figure 5:
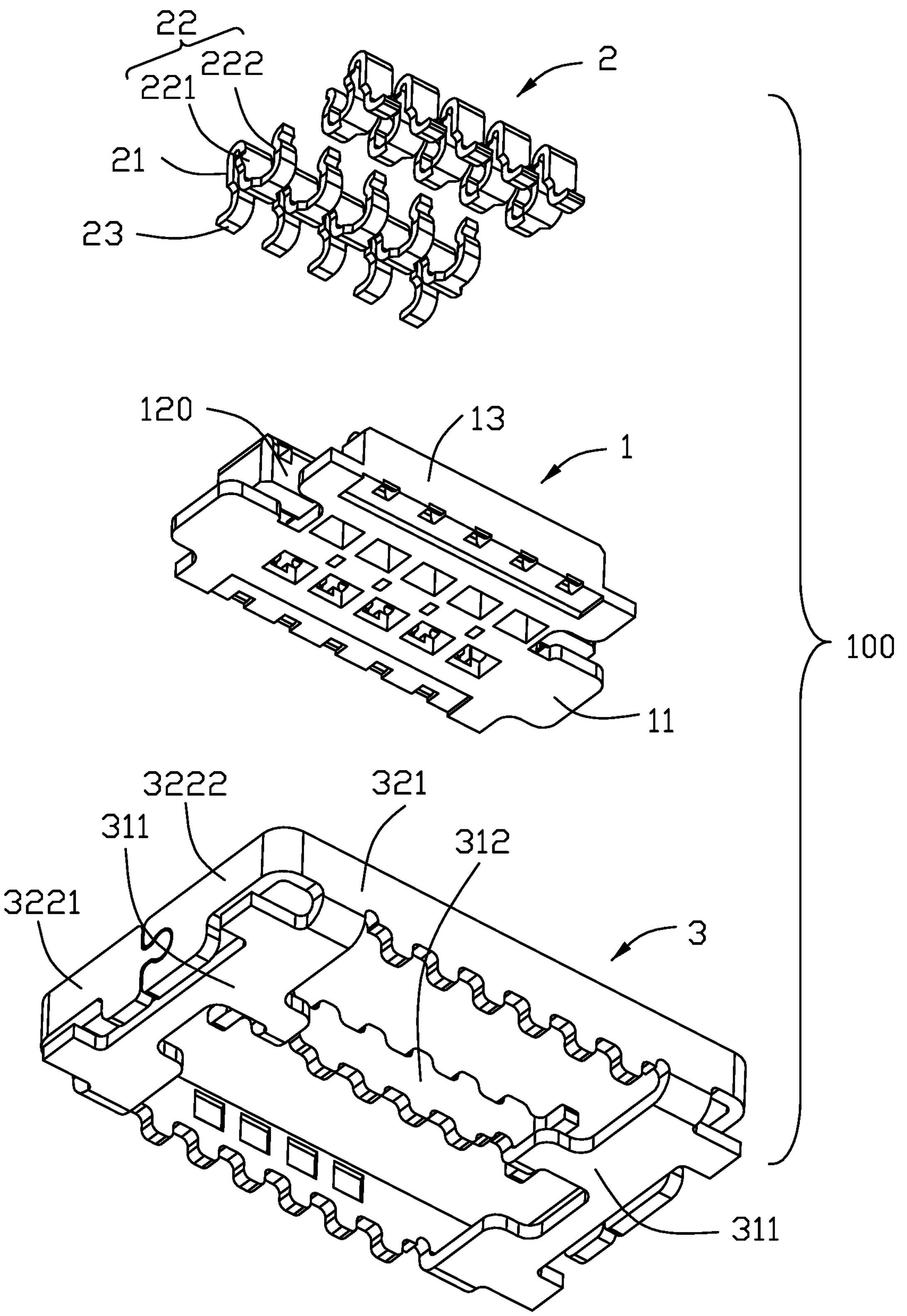
FIG. 5 is another exploded view of the receptacle connector.
Figure 6:
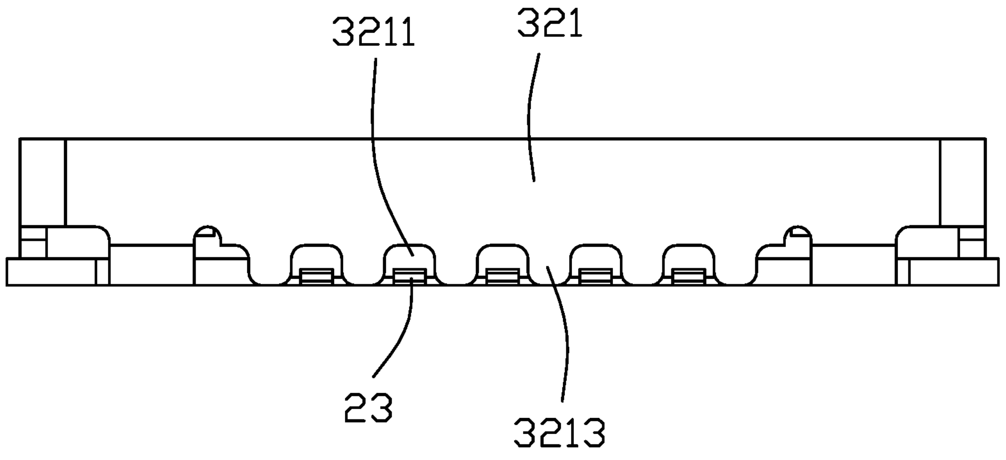
FIG. 6 is a side view of the receptacle connector.
Figure 7:
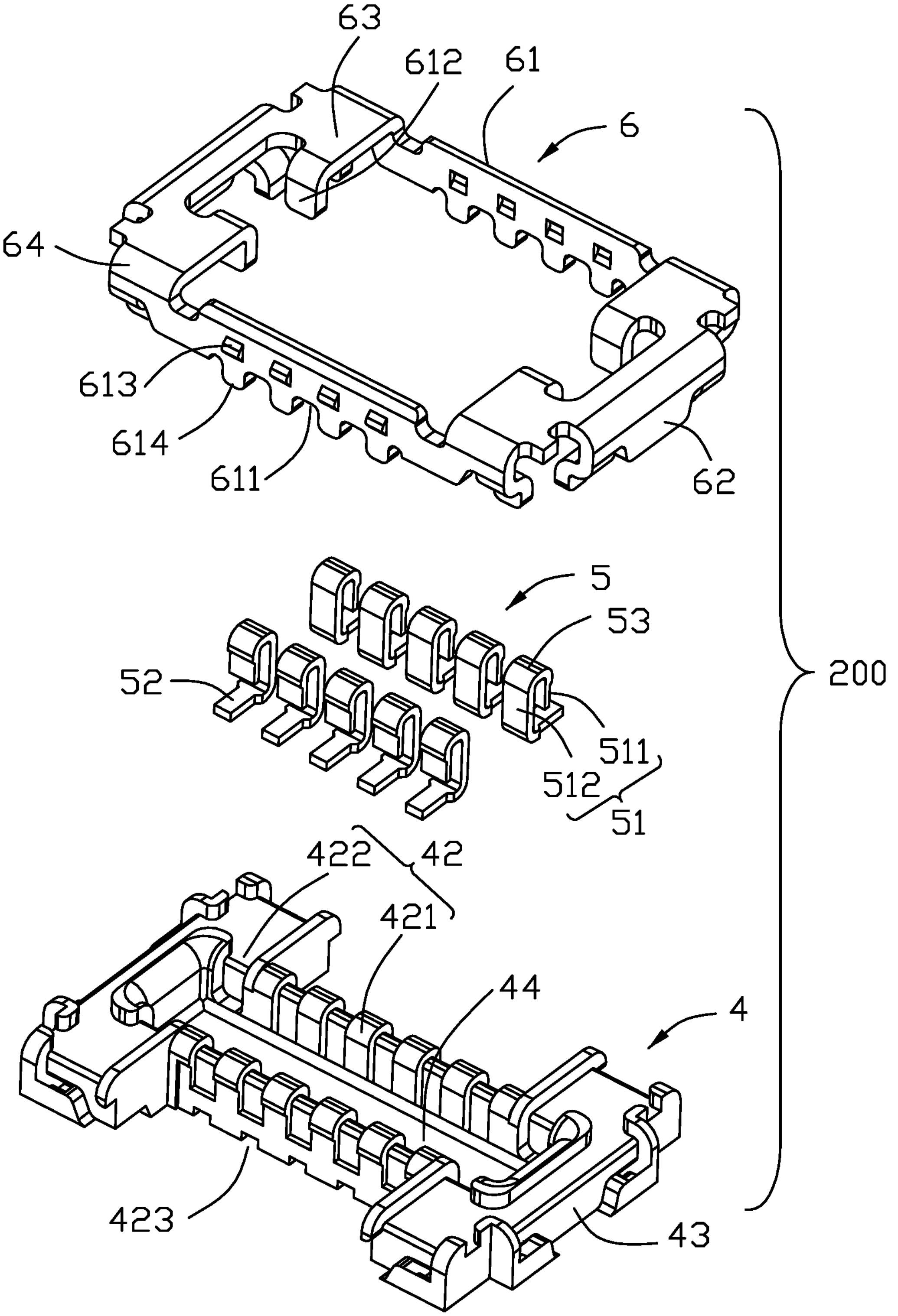
FIG. 7 is an exploded view of a plug connector of the electrical connector assembly.

Referring to FIGS. 1-13, an electrical connector assembly includes a receptacle connector 100 and a complementary plug connector 200. The receptacle connector 100 includes an elongated insulative housing 1, two rows of contacts 2 secured to the insulative housing 1, and an outer shielding shell 3. The plug connector 200 includes an elongated insulative housing 4, two rows of contacts 5 secured to the insulative housing 4, and a shielding cover 6 enclosing the insulative housing 4.

Referring to FIGS. 4-7 in particular, the receptacle connector housing 1 has a bottom wall 11, a pair of side walls 13 along a lengthwise direction, and an island 12 located between the pair of side walls 13 to define two longitudinal grooves 14. The shielding shell 3 has a base 31 secured to the bottom wall 11 of the insulative housing 1 and a peripheral wall 32 surrounding the pair of side walls 13 to form an annular groove 33. The two longitudinal grooves 14 are connected with the annular groove 33.

Each of the contacts 2 has a securing portion 21, a contacting portion 22 exposed to an associated groove 14, and a soldering tail 23 extending outwardly of the bottom wall 11. The contacting portion 22 has a first contact limb 221 at an inner face 131 of the side wall 13 and a second contact limb 222 at a corresponding slot 1211 formed on a side 121 of the island 12.

The base 31 of the shielding shell 3 has a horizontal bottom plate 311 formed of two separate parts secured to the island 12 of the insulative housing 1, a vertical shield plate 312 interconnected between the two parts, and a respective pair of engaging fingers 313 located at each of two longitudinal ends of the shield plate 312 and extending in opposite lateral directions to expose a respective abutment 3131 thereof out of a wall face 1201 of a corresponding expanded portion 120 of the island 12. The bottom plate 311 is substantially coplanar with the bottom wall 11 of the insulative housing 1.

The shielding shell 3 is formed of a unitary plate. The peripheral wall 32 of the shielding shell 3 includes a pair of longitudinal side walls 321 and a pair of lateral end walls 322. Each of the pair of lateral end walls 322 is formed of two connected parts 3221 and 3222. The soldering tails 23 of the contacts 2 are located inwardly of the side walls 321 and exposed to the annular groove 33. The side wall 321 has a plurality of inspection windows 3211 aligned with corresponding tails 23 of associated contacts 2.

Figure 8:
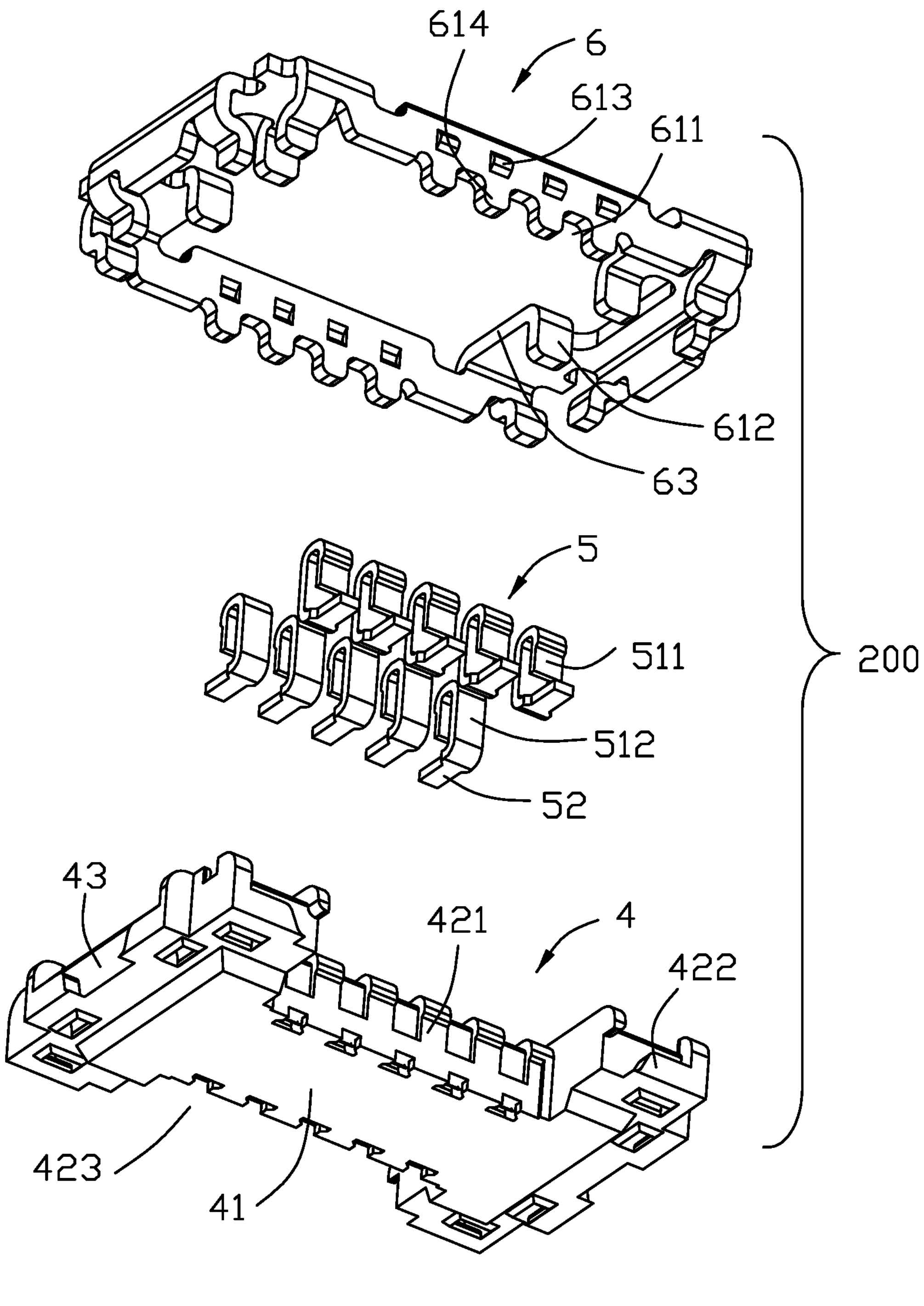
FIG. 8 is another exploded view of the plug connector.
Figure 9:
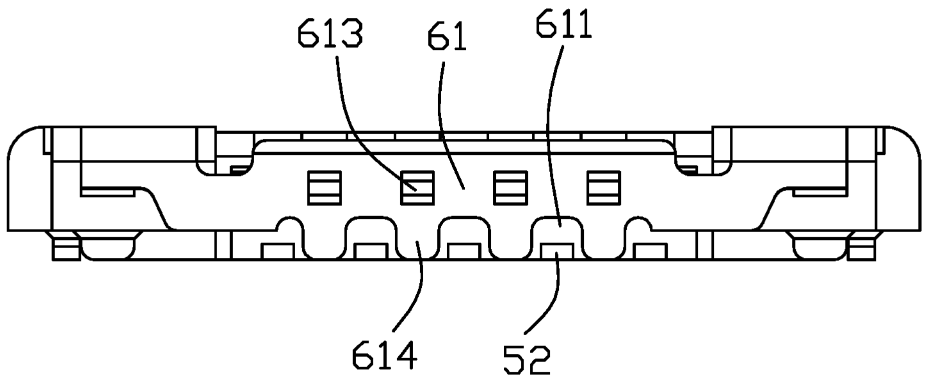
FIG. 9 is a side view of the plug connector.
Figure 10:
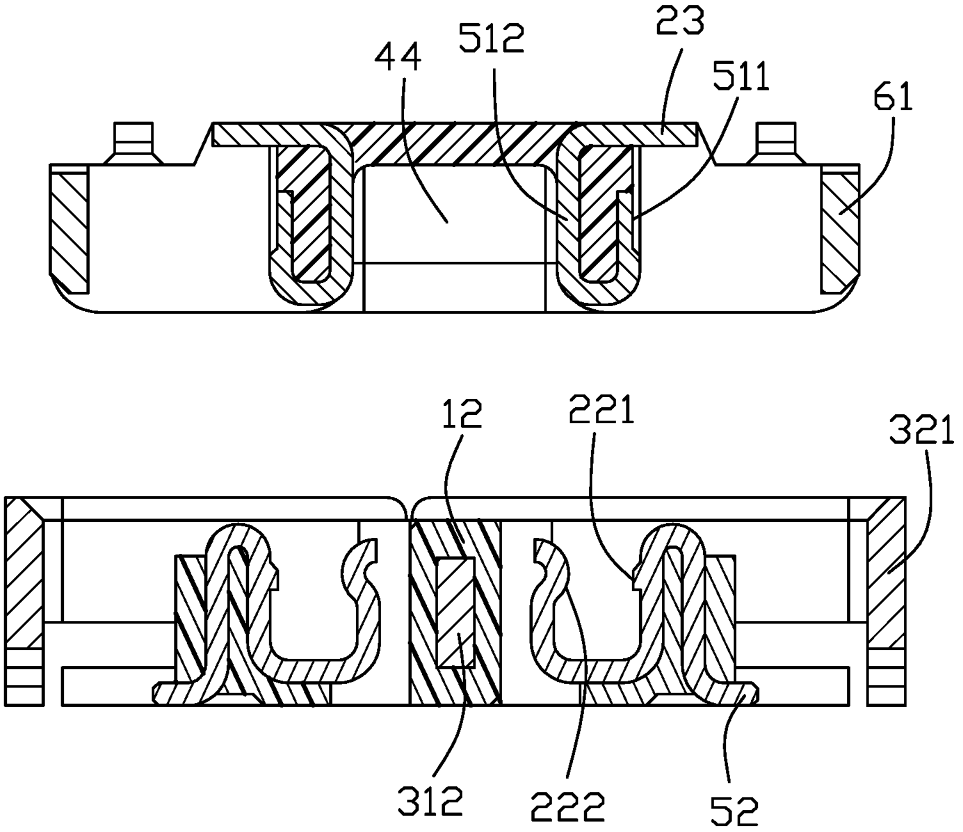
FIG. 10 is a cross-sectional view of the electrical connector assembly taken along line 10-10 in FIG. 1.
Figure 11:
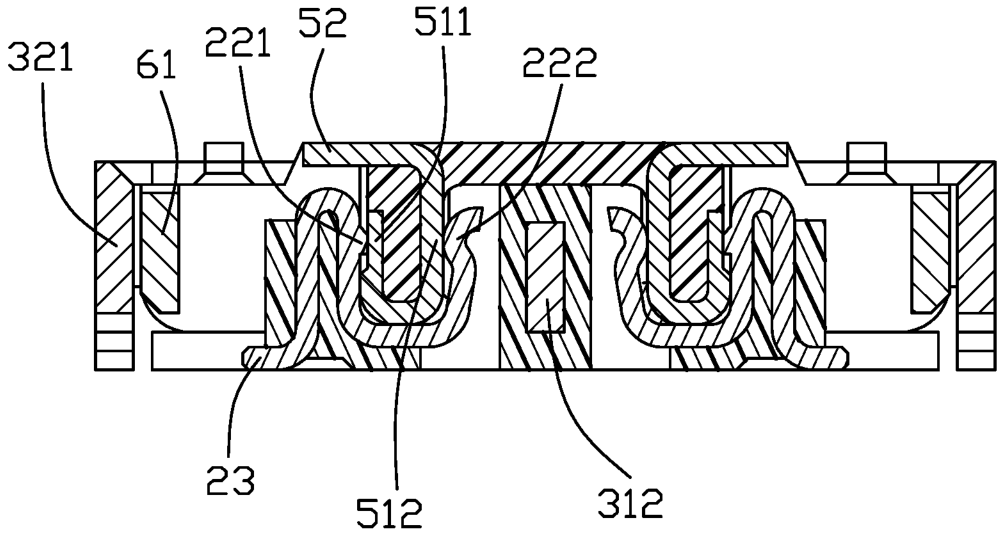
FIG. 11 is a cross-sectional view of the electrical connector assembly taken along line 11-11 in FIG. 3.
Figure 12:
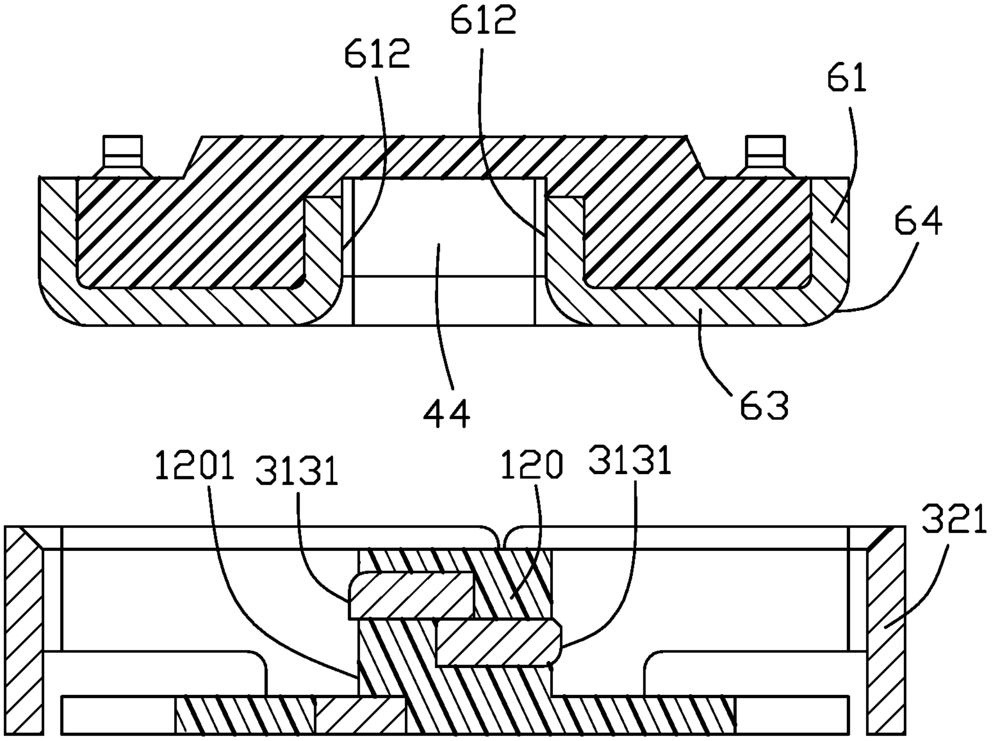
FIG. 12 is a cross-sectional view of the electrical connector assembly taken along line 12-12 in FIG. 1.
Figure 13:
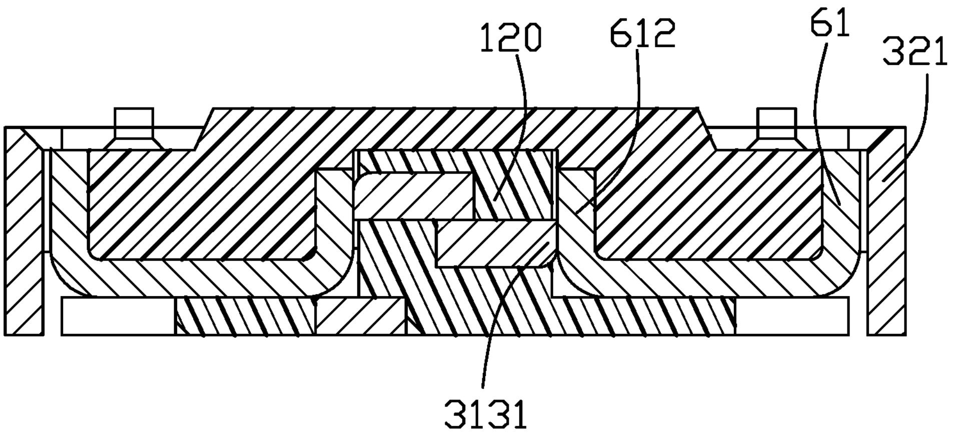
FIG. 13 is a cross-sectional view of the electrical connector assembly taken along line 13-13 in FIG. 3.

Referring to FIGS. 8 and 9 in particular, the insulative housing 4 has a bottom wall 41, a pair of side walls 42, and a pair of end walls 43. The pair of side walls 42 and the pair of end walls 43 together enclose a mating groove 44 for receiving the island 12. Each of the pair of side walls 42 has a wall portion 421 and a pair of expanded portions 422 at two opposite ends of the wall portion 421 to define a receiving space 423. The two rows of contacts 5 are secured to the two wall portions 421, respectively, and each row of contacts 5 are exposed to both the mating groove 44 and an associated receiving space 423. Each contact 5 has a contacting portion 51 and a soldering tail 52 extending outwardly of the wall portion 421 and exposed to the receiving space 423. The contacting portion 51 has first and second limbs 511 and 512 exposed to two opposite sides of the wall portion 421 and a connecting portion 53 between the first and second limbs 511 and 512.

The shielding cover 6 has a pair of side plates 61 and a pair of end plates 62 enclosing the pair of end walls 43 and the two receiving spaces 423 of the insulative housing 4. The soldering tails 52 of the contacts 5 are located inwardly of the side plates 61. The side plate 61 has a plurality of inspection openings 611 aligned with corresponding tails 52 of associated contacts 5. At least one of the pair of side plates 61 may have one or more tongues 612 for engaging the one or more corresponding fingers 313 of the shielding shell 3. The shielding cover 6 further has a top wall 63 from which the pair of side plates 61 and the pair of end plates 62 are bent. The top wall 63 has guiding faces 64. The shielding cover 6 is formed of a unitary plate.

When the plug connector 200 and the receptacle connector 100 are mated, the island 12 is received in the mating groove 44, the two wall portions 421 are received in the two grooves 14, the expanded portions 422 and the end walls 43 are received in the annular groove 33, and the pair of side walls 61 and the pair of end walls 62 of the shielding cover 6 engage an inner wall face of the peripheral wall 32 of the shielding shell 3. The side wall 61 may have protrusions 613 and the side wall 321 of the peripheral wall 32 may have recesses 3212 for receiving the protrusions 613. The side wall 61 may further have soldering legs 614 and the side wall 321 of the peripheral wall 32 may further have soldering legs 3213.

Provision of the shielding shell 3 on the receptacle connector 100, instead of on the plug connector 200, is believed beneficial to reduction of an overall height of the connector assembly.

What is claimed is:

1. An electrical connector comprising:
- an elongated insulative housing having a bottom wall, a pair of side walls along a lengthwise direction, and an island located between the pair of side walls to form two longitudinal grooves;
- a plurality of contacts secured to each of the pair of side walls and exposed to a corresponding groove; and
- a shielding shell having a base secured to the insulative housing and a peripheral wall surrounding the pair of side walls to form an annular groove; wherein
- the base of the shielding shell comprises a horizontal bottom plate formed of two parts and an integral vertical shield plate extending along the lengthwise direction and interconnected between the two parts.

2. The electrical connector as claimed in claim 1, wherein the two longitudinal grooves are connected with the annular groove.

3. The electrical connector as claimed in claim 1, wherein the bottom plate is substantially coplanar with the bottom wall of the insulative housing.

4. The electrical connector as claimed in claim 1, wherein the shield plate is secured to the island of the insulative housing.

5. The electrical connector as claimed in claim 1, wherein the base of the shielding shell comprises a respective pair of engaging fingers located at each of two longitudinal ends of the shield plate and extending in opposite lateral directions.

6. The electrical connector as claimed in claim 1, wherein the peripheral wall of the shielding shell comprises a pair of longitudinal side walls and a pair of lateral end walls, and each of the pair of lateral end walls is formed of two connected parts.

7. The electrical connector as claimed in claim 1, wherein the shielding shell is formed of a unitary plate.

8. The electrical connector as claimed in claim 1, wherein each of the plurality of contacts secured to each of the pair of side walls has a tail located inside the shielding shell and exposed to the annular groove.

9. The electrical connector as claimed in claim 8, wherein the peripheral wall of the shielding shell comprises a pair of longitudinal side walls each having a plurality of inspection windows aligned with corresponding tails of associated contacts.

10. An electrical connector assembly comprising:
- a first connector including:
  - an elongated insulative housing having a bottom wall, a pair of side walls along a lengthwise direction, and an island located between the pair of side walls to form two longitudinal grooves;
- a plurality of contacts secured to each of the pair of side walls and exposed to a corresponding groove; and
  - a shielding shell having a base secured to the insulative housing and a peripheral wall surrounding the pair of side walls to form an annular groove; and
- a complementary second connector including:
  - an elongated insulative housing having a bottom wall, a pair of side walls, and a pair of end walls, the pair of side walls and the pair of end walls together enclosing a mating groove, each of the pair of side walls having a pair of expanded portions at two opposite ends thereof to define a receiving space;
  - a plurality of contacts secured to each of the pair of side walls and exposed to both the mating groove and an associated receiving space; and
  - a shielding cover secured to the insulative housing and having a pair of side plates and a pair of end plates enclosing the pair of end walls and the two receiving spaces; wherein
- when the first and second connectors are mated, the pair of end walls and the pair of expanded portions of each side wall of the second connector are received in the annular groove of the first connector, and the pair of side walls and the pair of end walls of the shielding cover engage an inner wall face of the peripheral wall of the shielding shell; and
- the base of the shielding shell comprises a shield plate and a respective engaging finger located at each of two longitudinal ends of the shield plate, and the pair of side plates of the shielding cover comprises a pair of corresponding tongues for contacting corresponding engaging fingers.

11. The electrical connector assembly as claimed in claim 10, wherein the shielding cover comprises a top wall from which the pair of side plates and the pair of end plates are bent.

12. The electrical connector assembly as claimed in claim 10, wherein the shielding cover is formed of a unitary plate.

13. The electrical connector assembly as claimed in claim 10, wherein each of the plurality of contacts secured to each of the pair of side walls of the second connector has a tail located inside the shielding cover and exposed to an associated receiving space.

14. The electrical connector assembly as claimed in claim 13, wherein each of the pair of side plates of the shielding cover has a plurality of inspection openings aligned with corresponding tails of associated contacts.

15. An electrical connector comprising:

an elongated insulative housing having a bottom wall, a pair of side walls along a lengthwise direction, and an island located between the pair of side walls to form two longitudinal grooves;

a plurality of contacts secured to each of the pair of side walls and exposed to a corresponding groove; and a shielding shell having a base secured to the insulative housing and a peripheral wall surrounding the pair of side walls to form an annular groove;

wherein the base of the shielding shell comprises a shield plate secured to the island of the insulative housing; and wherein the base of the shielding shell comprises a respective pair of engaging fingers located at each of two longitudinal ends of the shield plate and extending in opposite lateral directions.

* * * * *